United States Patent [19]

Schomblond

[11] Patent Number: 4,711,621
[45] Date of Patent: Dec. 8, 1987

[54] INJECTION MOLDS INTENDED FOR THE PRODUCTION OF COMPOSITE BODIES SUCH AS MULTICOLORED LIGHT COVERS OR COMPONENTS MADE OF SEVERAL DIFFERENT MATERIALS

[75] Inventor: Jacques Schomblond, Montagnieu, France

[73] Assignee: Cartier Industrie, Thyez, France

[21] Appl. No.: 841,930

[22] Filed: Mar. 20, 1986

[30] Foreign Application Priority Data

Mar. 22, 1985 [FR] France ................ 85 04518

[51] Int. Cl.⁴ .............. B29C 39/12; B29C 45/10; B29C 45/16
[52] U.S. Cl. ..................... 425/120; 249/83; 249/161; 425/125; 425/126 R; 425/127; 425/129 R; 425/130; 425/553; 425/572; 425/581; 425/289
[58] Field of Search ............. 264/255; 425/570, 573, 425/120, 125, 126 R, 127, 129 R, 130, 553, 572, 574, 575, 588, 589, 577, 289; 249/155, 158, 160, 161, 162, 83

[56] References Cited

U.S. PATENT DOCUMENTS

| 4,157,883 | 6/1979 | Mares | 264/255 |
| 4,335,068 | 6/1982 | Hemery | 264/255 |
| 4,459,256 | 7/1984 | Ziegler | 264/255 |

FOREIGN PATENT DOCUMENTS

| 2425317 | 12/1979 | France. |
| 2462261 | 3/1981 | France. |
| 57-203531 | 9/1981 | Japan. |

Primary Examiner—Willard E. Hoag
Attorney, Agent, or Firm—Dowell & Dowell

[57] ABSTRACT

Molds for making composite bodies having at least three sections which are united along generally aligned intersections wherein the molds include two slideable molding blocks having molding cavities therein which are movably oriented with respect to a stationary molding cavity and wherein separate injectors are utilized to fill each of the cavities depending upon the positioning of such cavities.

10 Claims, 9 Drawing Figures

1

INJECTION MOLDS INTENDED FOR THE PRODUCTION OF COMPOSITE BODIES SUCH AS MULTICOLORED LIGHT COVERS OR COMPONENTS MADE OF SEVERAL DIFFERENT MATERIALS

BACKGROUND OF THE INVENTION

Field of the Invention

This invention concerns improvements to injection molds intended for the production of composite bodies such as multicolored light covers or components made of several different materials.

HISTORY OF THE ART

The injection molding process disclosed in French additional certificate No. 2 425 317 is well known, and the mold involved is also described. This mold is fitted with cross blades which form the side walls of several cavities in alignment with each other and in which materials of different colors are injected. After completion of the injection phase, the blades are moved transversally so that a remaining empty cavity can be filled by a new injection with the side walls formed by the already molded elements.

It can be easily understood that when the parts to be produced are rather thick, the blades deflect under the injection pressure, so that it is not practical to move them again. In such conditions, the mold described in said document cannot be used for the production of thick parts in several colors and/or materials.

We also know, as per document FR No. 2 462 261, a mold that can be used for the injection of thick composite parts using an injection ram that comes and rests against a bottom of the cavity in order to form the side walls of two chambers in which materials of different colors and/or qualities are injected, either simultaneously or successively. The ram is then displaced so as to obtain between its end and the bottom of the cavity a third chamber in which another material is injected. It is easy to understand that the ram cannot be moved with a sufficient degree of accuracy to prevent any offset of the third injection with respect to the first two injections. Such an offset is absolutely inacceptable for certain parts, and consequently this type of mold cannot be used in such applications.

We also know so-called "transfer molds" consisting of one ram and several dies, whereby successive injections are made through the ram, while the component under process is progressively transferred from one die to the next one, up to the last injection. It is easy to understand that such equipment is very expensive and that the elements molded in a given die may break when being transferred to the next die.

Finally we know from Japanese document No. 57-203 531 a mold made of two blocks in each of which a partial cavity is bored. The form of of each partial cavity corresponds to that of one of the elements of the component to be produced. The element is obtained by a first injection in one partial cavity, while a sliding part is offset with respect to the middle plane of the cavity intended for the molding of at least one other element and which is situated in a fixed part of the mold. The other element is injected after the sliding part has been returned to a position in which its cavity is level with the other cavity.

SUMMARY OF THE INVENTION

The purpose of the improvements covered by the present invention is to remedy the inconveniences mentioned above, and also to make it possible to realize a mold that better meets the requirements encountered in the molding art.

To this end, the mold realized according to the invention makes it possible to produce thin or thick parts without any visible joints between the successively molded elements.

The mold according to the invention contains a second sliding block, in the cavity of which an injection is performed at the same time as in a cavity of the first sliding block. The second sliding block is equipped with devices that keep it offset during the second injection and align it with respect to the already molded elements in view of a third injection.

The annexed drawings, given as an example, will help to better understand the invention, its characteristics and the advantages offered.

Figure 1:
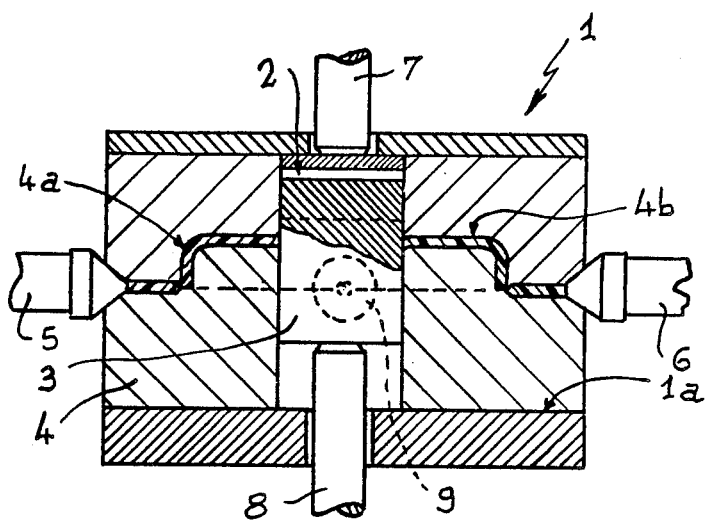
FIG. 1 is a cross section of a mold corresponding to the known technique and shows the molding of the two exterior parts of the body to be produced.
Figure 2:
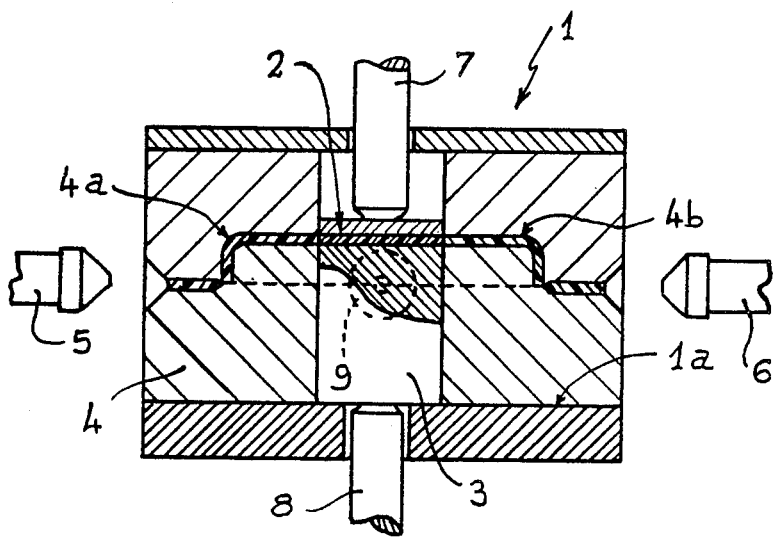
FIG. 2 is a view similar to FIG. 1, but showing the cavity of the sliding block as aligned with the previously molded elements, so as to allow for the injection of a middle element in a different color and/or material.

The FIGS. 1 and 2 illustrate a mold 1 intended for producing a body consisting of three elements, which are respectively molded in the cavity 2 of a sliding block 3 and in the cavities 4a and 4b of the fixed part 4 of the mold. The sliding block is of course realized in two parts, as is part 4, so as to allow for the demolding of the finished body in the usual and well known way. In the first phase as illustrated by FIG. 1, the sliding block is moved in such a manner as to offset its cavity with respect to the cavities 4a and 4b. In this way, the side faces of the sliding block form the side walls of cavities 4a and 4b. Synthetic material is then injected, simultaneously or successively, in the cavities 4a and 4b, using two injection nozzles 5 and 6. After completion of the injection and hardening of the elements, the sliding block is moved by means of two pistons or jacks, of which only the heads 7 and 8 are shown, in such a manner that the cavity 2 is positioned very accurately at the same level as the two previously molded elements. For this purpose, the sliding block comes to rest accurately against a face 1a of the mold, so that there can be no misalignment between the element molded in the cavity 2 and those injected in the cavities 4a and 4b.

When the sliding block is correctly positionned, the cavity is filled using a third injection nozzle 9 (FIG. 2).

Figure 3:
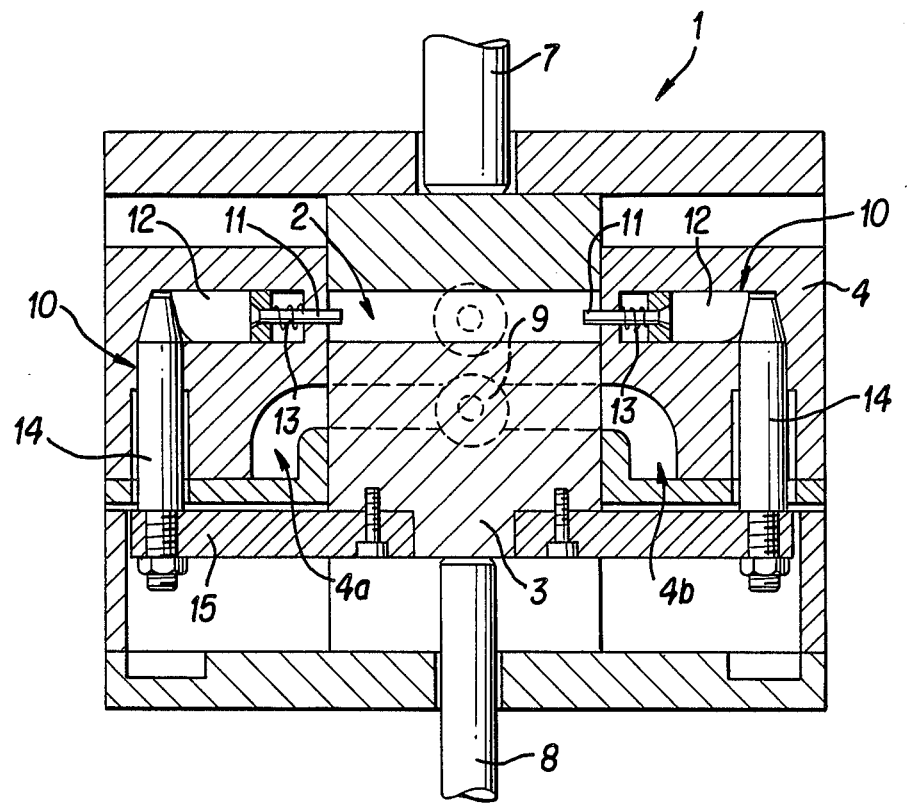
FIG. 3 shows in what way the sliding block can be equipped with special devices in order to interlock the middle element with both side elements.

In the example shown in FIG. 3, mechanisms 10 are provided in the fixed part 4 for the purpose of cutting grooves along the edges of the element molded in cavity 2 and lying flush with the elements moulded in the cavities 4a and 4b. In this case, the middle element of cavity 2 is of course injected first, after which the sliding block is lowered in order to perform molding in the cavities 4a and 4b. Each of the devices 10 is fitted with a blade 11 which is pushed inside the cavity 2 by means of a wedge 12, against the action of a compression spring 13, this wedge interacting with the conical end of a shaft 14 fastened to a plate 15 integral with the base of the sliding block 3. Each spring 13 rests against the corresponding wedge 12 and the same back when the shaft 14 moves down to thereby retract the blade 11. During the injection phase in the cavity 2, the blades are disposed inside the cavity along two opposite edges. When the sliding block 3 is lowered after completion of the injection phase, the shafts 14 release the wedges 12 and the blades retract under the action of the compression springs 13. In this manner, the element molded in cavity 2 is moved to a position which is perfectly level with the cavities 4a and 4b, and is provided with interlocking grooves that improve the resistance of the body obtained, as mentionned above.

Figure 4:
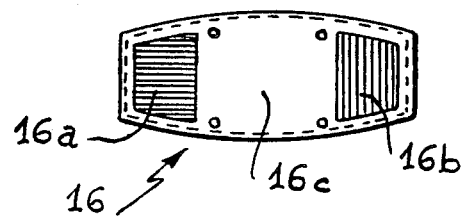
FIG. 4 shows a body made of two elements in different colors and/or materials, surrounded by a third element that supports both of them.
Figure 5:
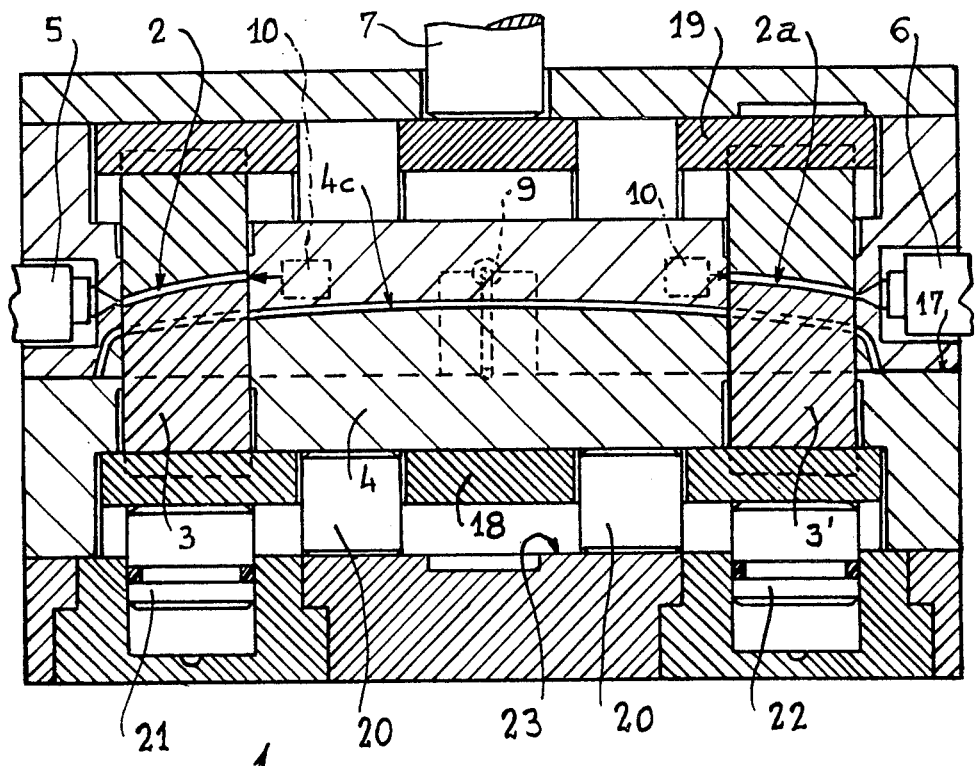
FIG. 5 is a view similar to FIGS. 1 and 2, but showing a mold according to the invention, consisting of a fixed block and two sliding blocks.

In the examples shown on FIGS. 1 to 3, the two parts of the sliding block 3 are in contact with each other by their contact surface, as well as the two components of the fixed part 4. When the body to be produced is similar to the part 16 illustrated in FIG. 4 and made of two elements 16a and 16b completely embedded into an element 16c, it is necessary to make use of a mold similar to the one shown on FIG. 5.

This type of mold contains two sliding blocks 3 and 3' forming respectively the cavities 2 and 2a, inside which the elements 16a and 16b are molded, when both sliding blocks are offset upwards with respect to the cavity 4c of the fixed part 4 of the mold. It is to be noted that both sliding blocks move inside the fixed part 4 in such a way that the cavity 4c extends equally beyond both sliding blocks.

The injection of the elements 16a and 16b is performed by means of the injection nozzles 5 and 6, the sliding blocks being offset towards the top. The sliding blocks are then lowered in order to mold the element 16c in the cavity 4c using the third injection nozzle 9.

It is to be noted that the two components of part 4 rest against each other along a peripheral contact surface 17. The two parts of the sliding blocks are respectively associated to a bottom plate 18 and to a top plate 19 that moves with respect to rest props 20. The top plate is linked to the piston rod 7, while the bottom plate 18 interacts with two pistons 21 and 22 which functions as piston 8.

In this example, the two parts of both sliding blocks 3 and 3' are respectively fastened to the bottom plate 18 and to the top plate 19, which are linked together by means of non-represented clamps, in order to adjust accurately the height of the cavities 2 and 2a.

As soon as the injection phase of the elements 16a and 16b is completed in cavities 2 and 2a, the sliding blocks are lowered again and the cavities are positionned accurately with respect to the cavity 4c by bringing the bottom plate 18 to stop against a rest surface 23. Here again, any offset is prevented between the elements 16a, 16b and 16c.

In the fixed part 4 of the mold, devices 10 such as those illustrated on FIG. 3 can be provided in order to cut interlocking grooves in at least some of the edges of the elements 16a and 16b and thus improve the resistance of the body 16.

Each of the sliding blocks can be provided with some device intended for cutting a groove along at least a certain part of the peripheral edge of the element molded in the corresponding cavity (2 or 2a).

Figure 6:
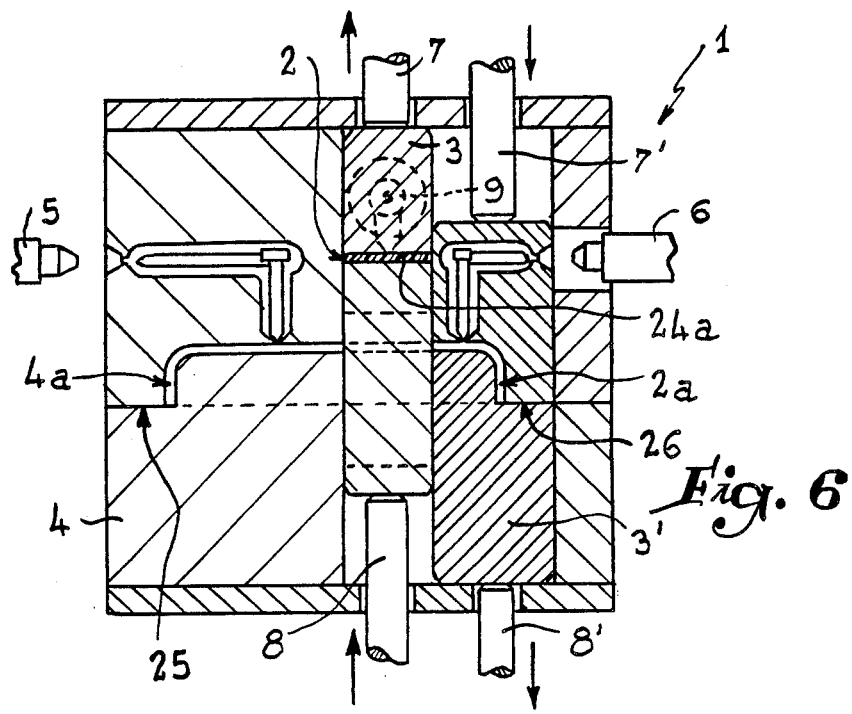
FIGS. 6, 7 and 8 show the molding in three phases of a body made of three elements, the mold having two sliding blocks mounted side by side.
Figure 7:
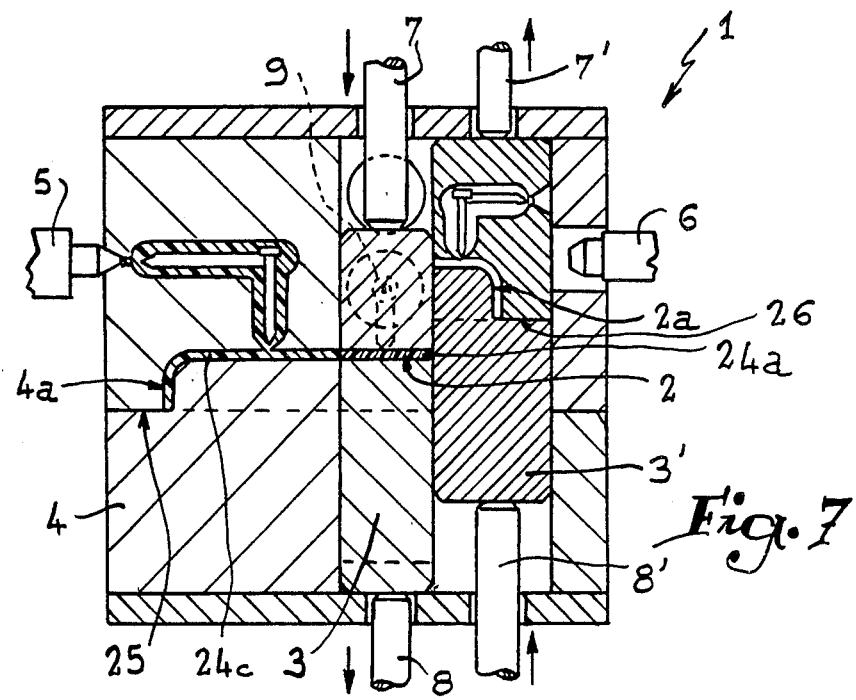
Figure 8:
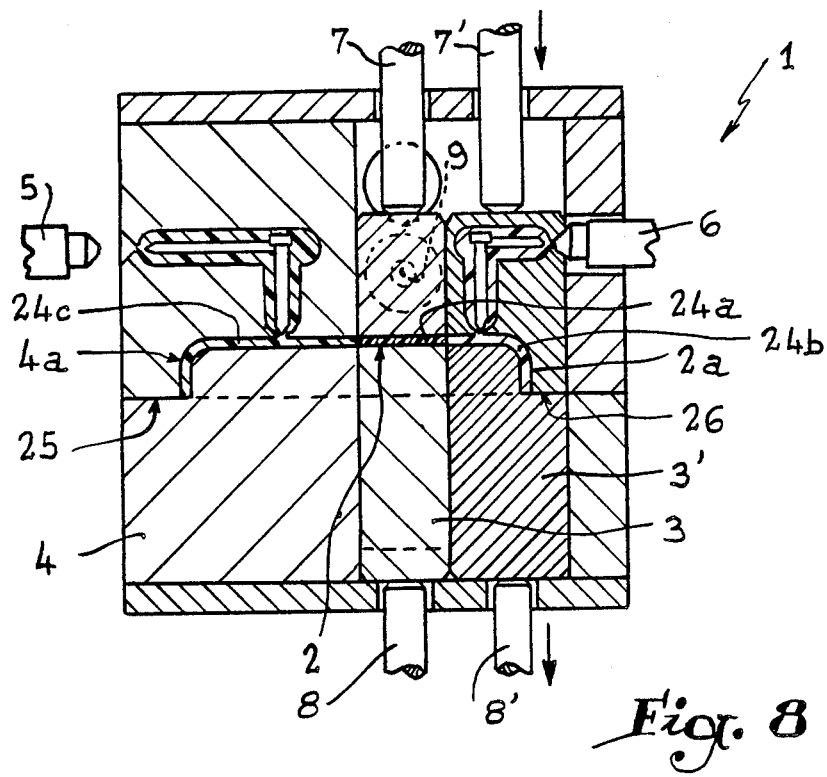

In another example according to the invention and illustrated on FIGS. 6, 7 and 8, the mold still contains two sliding blocks, but they are mounted side by side; this system allows for moldings to be performed according to three different contact planes. For instance, bodies similar to part 24 illustrated on FIG. 9 can be produced, which consist of a middle element 24a entirely surrounded by two different elements 24b and 24c, touching each other along two contact lines 24d and 24e. The mold illustrated on FIGS. 6 to 8 contains a fixed part 4 made of two components resting against each other along a contact surface 25. The cavity 4a intended for molding the element 24c of part 24 is partly determined in each of the mentioned components of the fixed part 4.

The sliding block 3 is adjacent to the fixed part 4, and its cavity 2 is intended for the molding of the element 24a of part 24, while a second sliding block 3' mounted near the first sliding block has a cavity 2a intended for the molding of the element 24b of part 24. The two parts of the sliding block 3' rest against each other along a contact surface 26. The sliding block 3 is associated with the pistons 7 and 8 described with reference to FIGS. 1 to 3, while the sliding block 3' interacts with two other pistons or jacks, the shafts of which are marked 7' and 8'.

As shown on FIG. 6, the sliding block 3' must first be positionned so that its cavity 2a comes to lie in the plane of the cavity 4a of the part 4, while the sliding block 3 is offset towards the top. Using the injection nozzle 9, synthetic material is injected in the cavity 2 of the sliding block 3, this cavity being closed laterally by the side faces of the part 4 and of the sliding block 3'.

Thereafter, and as illustrated on FIG. 7, the sliding block 3 is lowered in such a manner as to bring its cavity to lie level with the cavity 4a of the part 4, while the sliding block 3' is raised in order to close the cavity 4a at the level of the contact lines 24d and 24e of the elements 24b and 24c respectively molded in the cavity 4a and in the cavity 2a. Thereafter, the injection nozzle 5 pours synthetic material into the cavity 4a to produce the element 24c of the body.

At last and as illustrated by FIG. 8, the sliding block 3' is lowered again in order to bring its cavity to lie flush with that of the sliding block 3 and with 4a. Using the injection nozzle 6, the element 24b of the part 24 is molded in the cavity 2a of the sliding block 3'.

Figure 9:
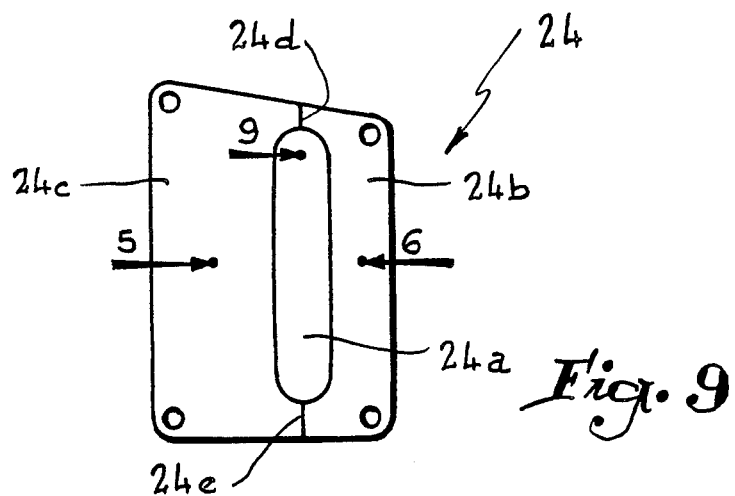
FIG. 9 represents a body that could be molded using the equipment shown on FIGS. 6 to 8.

This way, the mold represented on FIGS. 6 to 8 makes it possible to produce the body shown on FIG. 9, where the three injection nozzles used to mold successively the different elements of the part 24 have been drawn schematically.

I claim:

1. An apparatus for molding composite bodies having at least three separately injected sections formed of separate molding materials which are joined along aligned intersections comprising, a first molding block means of two mold members defining a first mold cavity therebetween, first and second adjustable molding block means movable relative to said first molding block means and having second and third cavities therein, respectively, at least said first adjustable molding block means being in slideable engagement with said first molding block means, means for moving said first and second adjustable molding block means between first positions in which said second and third cavities are closed and remotely spaced from said first cavity and second positions wherein said second and third cavities are aligned in open communication with said first cavity, first injector means for introducing molding material into said first cavity, second injector means spaced from said first injector means introducing molding material into said second cavity when said first adjustable block means is in said first position and third injector means for introducing molding material into said third cavity whereby the material is introduced into said second cavity when said second cavity is remote from said first cavity to form one of the three sections of the composite body and thereafter moved into alignment with said first cavity.

2. The apparatus of claim 1 in which both of said first and second adjustable molding block means are in slideable engagement with said first molding block means and are remotely spaced with respect to one another.

3. The apparatus of claim 2 in which said first and second adjustable molding block means intersect said first cavity so that said second and third cavities are surrounded by said first cavity when said first and second adjustable molding blocks are in said second position.

4. The apparatus of claim 3 in which said third injector means is positioned so as to introduce material into said third cavity when said second adjustable molding block is in said first position.

5. The apparatus of claim 4 in which said means for moving said first and second adjustable molding block means include opposing piston means for simultaneously moving said first and second adjustable molding block means between said first and second positions.

6. The apparatus of claim 4 in which said two mold members of said first molding block means are formed as upper and lower sections which define said first cavity therebetween.

7. The apparatus of claim 1 in which said second adjustable molding block means is slideably engaged with both said first adjustable molding block means and said first molding block means.

8. The apparatus of claim 7 in which said second adjustable molding block means and said first molding block means surround said first adjustable molding block means.

9. The apparatus of claim 8 in which said third injector means introduces molding material into said third cavity when said second adjustable molding block means is in said second position.

10. The apparatus of claim 9 in which said means for moving said first and second adjustable molding block means includes a first pair of opposing piston means for moving said first adjustable molding block means and a second pair of opposing piston means for moving said second adjustable molding block means whereby said first and second molding block means are independently movable with respect to one another.

* * * * *